March 24, 1964     D. R. CLEMINSHAW     3,126,507
SWITCH ASSEMBLY FOR REMOTE CONTROL DEVICE
Filed Feb. 25, 1960     3 Sheets-Sheet 1
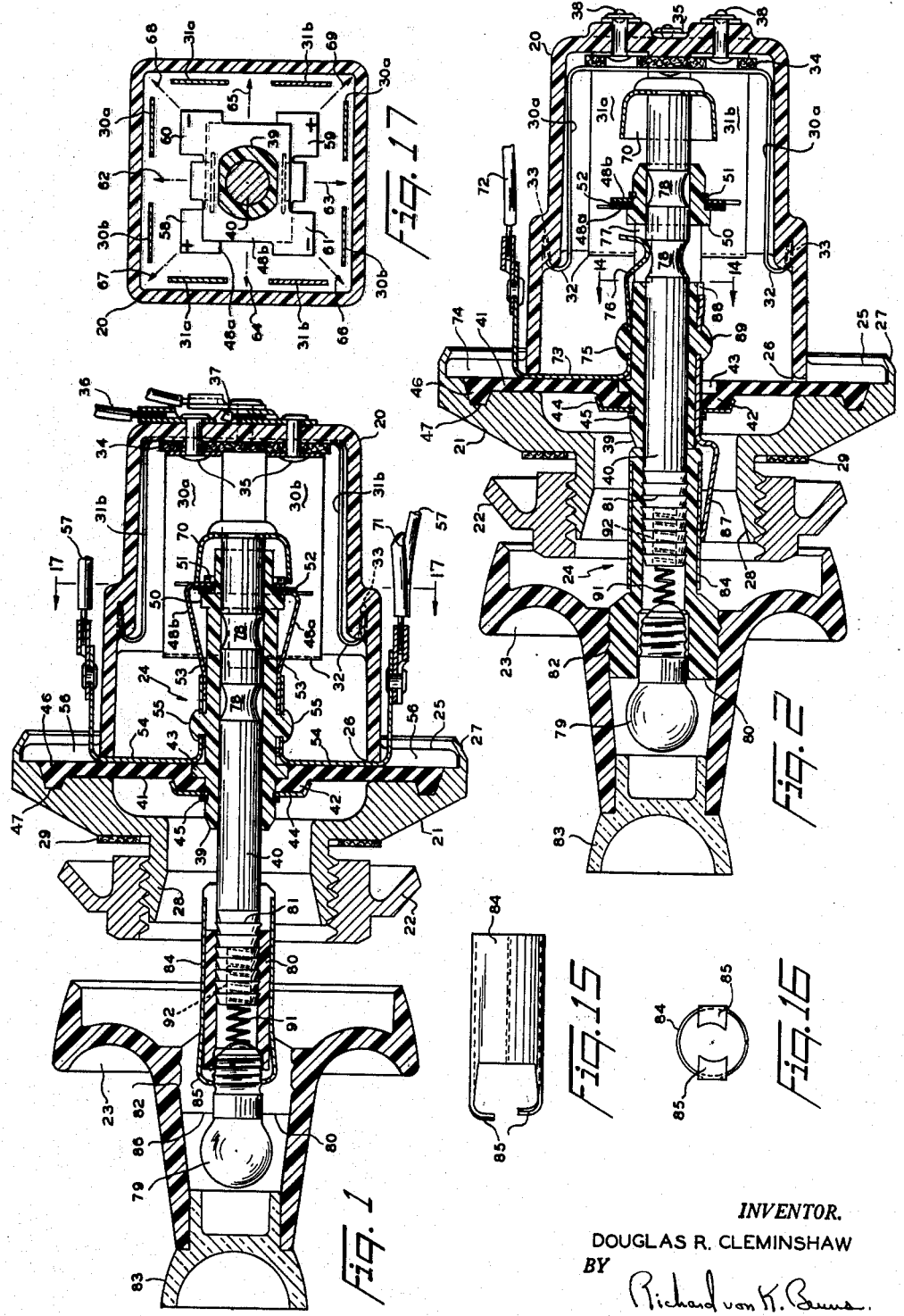
INVENTOR.
DOUGLAS R. CLEMINSHAW
BY
Richard von K. Burns
Atty.

March 24, 1964  D. R. CLEMINSHAW  3,126,507
SWITCH ASSEMBLY FOR REMOTE CONTROL DEVICE
Filed Feb. 25, 1960  3 Sheets-Sheet 2
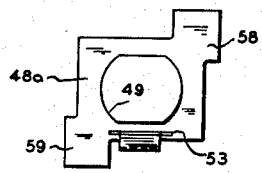
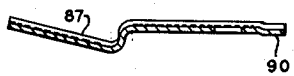
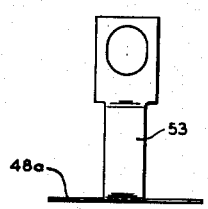
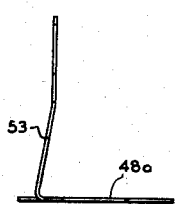
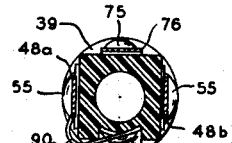
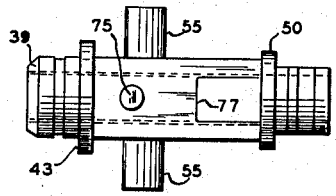
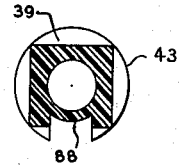
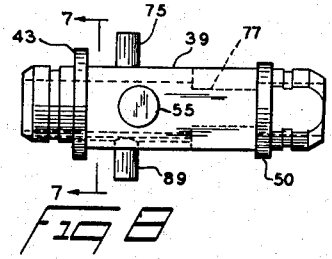
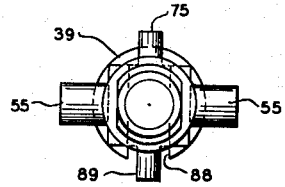
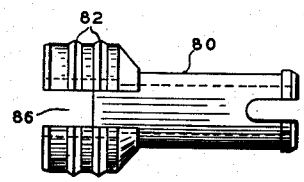
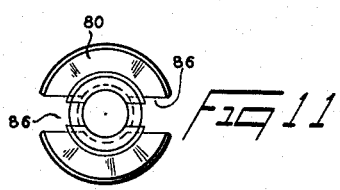
INVENTOR.
DOUGLAS R. CLEMINSHAW
BY
Atty.

INVENTOR.
DOUGLAS R. CLEMINSHAW

United States Patent Office 3,126,507
Patented Mar. 24, 1964

3,126,507
SWITCH ASSEMBLY FOR REMOTE CONTROL DEVICE
Douglas R. Cleminshaw, Syracuse, N.Y., assignor to R. E. Dietz Company, Syracuse, N.Y., a corporation of New York
Filed Feb. 25, 1960, Ser. No. 10,976
10 Claims. (Cl. 318—293)

This invention relates generally to electric switches, and is specifically directed to an improved construction and arrangement for a switch of the multi-position type.

The primary object of the invention is to provide a switch of the above type that is particularly adapted for controlling the operation of a remotely located device such as a pivotally mounted spotlight or the like. More specifically, the switch of the invention is adapted for use with a spotlight device such as that disclosed in the applicant's copending Ser. No. 4,405 filed January 25, 1960, now U.S Patent 3,035,160, issued May 15, 1962, although it will be apparent from the description to follow that the switch can also be advantageously utilized for the control of a number of other types of devices. In the copending application referred to, the spotlight device is pivotally mounted for rotational movement about each of two noncolinear axes, and a pair of independent electric motors are provided for producing the diverse rotational movements. The switch to be disclosed is arranged to selectively control the operation of either motor alone or both motors together and also to control the on and off condition of the spotlight lamp.

Another important object of the invention is to provide a switch of the character described that makes the operation of the remotely located device extremely simple, all of the circuits for the device being under the control of a single, easily manipulatable switch actuator.

Another important object of the invention is to provide a switch of the character described which enables the motor drives to be reversed at will.

A further important object of the invention is to provide a switch of the character described having a self-contained pilot lamp for indicating to the operator whether the remotely located spotlight lamp is on or off.

Still another important object of the invention is to provide a switch of the character described that is compact and easy to install on the dashboard of a vehicle or at any other desired location.

A still further important object of the invention is to provide a switch of the character described which is durable and reliable in operation, the switch having a minimum number of parts that are subject to wear.

A more specific object of the invention is to provide a switch of the character described wherein the switch actuator is mounted in the switch housing by means of a single resilient support which comprises a unitary diaphragm member, the diaphragm member permitting free radial movement of the ends of the actuator relative to the housing.

Other objects and advantages of the invention will become apparent from the following detailed description thereof read in conjunction with the accompanying drawings which illustrate a representative embodiment of the invention for the purpose of disclosure.

In the drawings:

FIGURE 2 is a vertical longitudinal section through the center of the switch assembly (taken at right angles to FIGURE 1) showing the switch actuator in its other longitudinal position;

FIGURE 3 is a top plan view of one of the motor contacts;

FIGURE 4 is a front elevation of the motor contact of FIGURE 3;

FIGURE 5 is a side elevation of the motor contact of FIGURE 3;

FIGURE 6 is a top plan view of the actuator sleeve;

FIGURE 7 is a vertical section through the actuator sleeve taken substantially along line 7—7 of FIGURE 8;

FIGURE 8 is a side elevation of the actuator sleeve;

FIGURE 9 is an end elevation of the actuator sleeve looking toward the right end of FIGURE 8;

FIGURE 10 is a top plan view of the pilot sleeve bushing;

FIGURE 11 is an end view of the pilot sleeve bushing;

FIGURE 12 is a top plan view of the pilot contact finger;

FIGURE 13 is a vertical longitudinal section through the finger taken substantially along line 13—13 of FIGURE 12;

FIGURE 14 is a vertical transverse section taken substantially along line 14—14 of FIGURE 2 and showing the relationship of the pilot contact finger to the actuator sleeve and one of the motor contacts;

FIGURE 15 is a top plan view of the pilot contact sleeve;

FIGURE 16 is an end elevation of the pilot contact sleeve;

FIGURE 17 is a vertical transverse section taken substantially along line 17—17 of FIGURE 1 and showing the relationship of the two motor contacts to the motor contact fingers; and FIGURE 18 is a wiring diagram of the switch assembly of FIGURES 1 and 2 electrically connected for operation of a spotlight device.

Figure 1B:
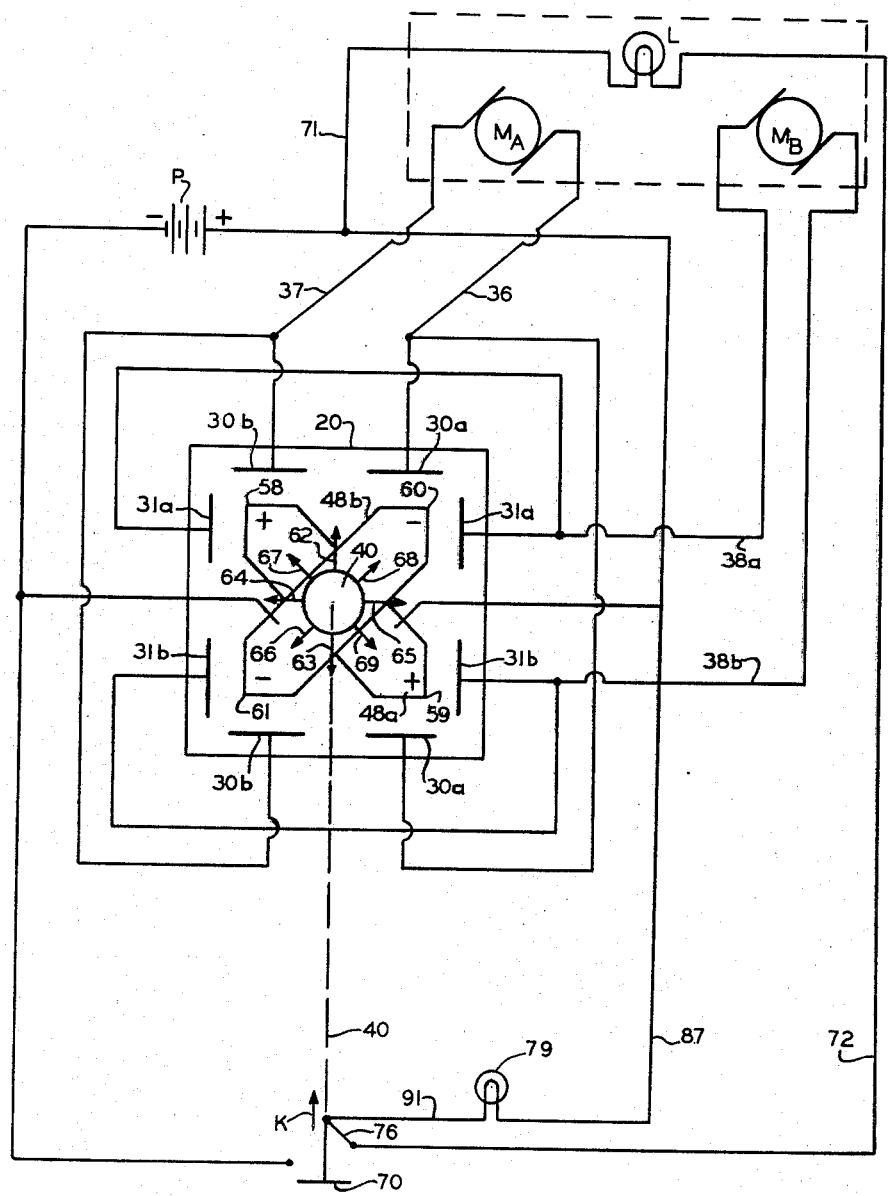
FIGURE 1 is a horizontal longitudinal section through the center of a switch assembly embodying the invention, the view being approximately twice actual size and showing the switch actuator in one of its alternative longitudinal positions.

Referring now to the drawings, wherein like reference numbers designate the same part in each of the views, FIGURES 1 and 2 illustrate the switch assembly which includes a housing 20, a housing cover 21, a decorative retaining or mounting nut 22, and a decorative operating knob 23 that is mounted on the outer end of the switch actuator indicated generally at 24. The housing 20, which is formed of a non-conducting material such as plastic, is a substantially rectangular receptacle provided with an outwardly projecting circular flange 25 at the open end 26 thereof. The housing cover 21 is formed of a metal alloy and is provided with a circular flange 27 that is spun over the housing flange 25 to hold the parts in assembled relation. The reduced outer end 28 of the cover is adapted to project through a hole in a vehicle dashboard (not shown) or other suitable panel or bracket, and is maintained in position by the retaining nut 22 which is threaded onto the reduced end on the front side of the panel. A suitable gasket or washer 29 may be mounted on the cover to bear against the back side of the panel as indicated.

Mounted in the housing 20 are two pairs of motor contact fingers 30a, 30b and 31a, 31b, see FIGURES 1, 2 and 17. These fingers have a U-shaped configuration and extend along the closed end and opposite side walls of the housing, the outer ends of the fingers being bent over as at 32 and received in pockets 33 formed in the housing. As shown in the drawings, the pair of fingers 30a—30b are disposed at right angles to the pair of fingers 31a—31b, and the two pairs of fingers are insulated from one another at the end of the housing by a fiber plate 34. The fingers 30a, 30b, FIGURE 1, are secured to the end of the housing as by rivets 35 which pass between the fingers 31a, 31b and are connected on the outside of the housing to conductors 36, 37 leading to one of the motors or circuits to be controlled by the switch. Similarly, fingers 31a, 31b are secured to the end of the housing as by rivets 38, FIGURE 2, which are connected on the outside of the housing to a pair of conductors 38a, 38b (FIG. 18) leading to the other motor to be controlled by the switch.

The switch actuator 24 is an elongated, manually operable assembly which projects into the housing as shown and includes a sleeve 39 of non-conducting material such as plastic and a metal plunger element 40 movable longitudinally in the sleeve. The actuator is supported by a resilient diaphragm member 41 formed of neoprene or the like, the diaphragm having a central boss 42 and hole through which the sleeve 39 passes. The marginal edge of the boss abuts against an annular flange 43 on the sleeve and is held in position by a metal retainer disc 44 and snap ring 45. The outer rim of the diaphragm is clamped between the housing cover 21 and housing flange 25, the diaphragm having an edge positioning flange 46 which is received in a complementary groove 47 in the cover as shown. The diaphragm thus normally supports the actuator centrally with respect to the housing but permits gyratory or radial movement of the ends of the actuator for a purpose to be presently described.

Mounted on the inner end of the actuator sleeve 39 are a pair of contact plates 48a, 48b, one of which is shown in detail in FIGURES 3-5. Each plate is formed with a central opening 49 having opposed flat sides, and the end of the sleeve is correspondingly formed to prevent rotation of the plates relative to the sleeve, see FIGURES 8, 9 and 17. The contact plates are positioned on the sleeve between an annular flange 50 and snap ring 51, and are separated from one another by a fiber insulating plate 52, FIGURES 1 and 2.

The contact plates are provided with extension arms 53 which extend axially along opposite sides of the actuator sleeve for engagement with the power lead in strips 54. The sleeve has a square cross section at the point of engagement of the extension arms and lead in strips, FIGURES 7 and 14, and is provided on its opposite flat sides with cylindrical projections 55 which are swaged over as indicated in FIGURE 1 to hold the arms and strips in contact with one another. The strips 54 pass out of the housing through a pair of diametrically opposed slots 56 cut in the housing flange 25 and are connected at their outer ends to a pair of conductors 57 coming from a storage battery (not shown) or other suitable current source.

The contact plate 48a, FIGURES 3-5 and 17, is formed with corner projections 58, 59 on two diagonally opposite corners thereof, and the plate 48b is formed with similar projections 60, 61 on the opposite pair of diagonal corners so that when the plates are mounted on the actuator, there is a projection at each corner of the contact assembly as is best shown in FIGURE 17. Since one of the plates will be connected to the plus side of the battery and the other plate will be connected to the minus side of the battery, the projections 58, 59 on plate 48a, for example, will have a plus charge and the projections 60, 61 on plate 48b will have a minus charge as indicated by the polarity signs in FIGURE 17. Accordingly, if the actuator is manipulated so that its inner end is moved in the direction of arrow 62, the projections 58 and 60 on the plates will be brought into engagement with the motor contact fingers 30b and 30a and the motor connected with those fingers will be actuated. Movement of the actuator in the direction of arrow 63, on the other hand, will bring the projections 61 and 59 into engagement with the opposite sides of the contact fingers 30b and 30a so that the same motor will be actuated but in the reverse direction since the direction of the current has been reversed as will be apparent from the polarity signs on the projections. Similarly, movement of the actuator in the direction of arrow 64 will engage projections 58 and 61 with contact fingers 31a and 31b to actuate the other motor, and movement of the actuator in the direction of arrow 65 will engage projections 60 and 59 with the other sides of contact fingers 31a and 31b to actuate the same motor in the opposite direction.

In addition to movement in the direction of arrows 62-65, the actuator can also be moved diagonally in the direction of arrows 66-69 to cause actuation of both motors simultaneously in various combinations of directions. For example, movement in the direction of arrow 66 will bring projection 61 into engagement with contact fingers 31b and 30b, projection 58 into engagement with finger 31a, and projection 59 into engagement with finger 30a whereby both motors will be actuated, the motor connected to contact fingers 30a, 30b being designated motor $M_A$ (FIG. 18) and the motor connected to contact fingers 31a, 31b being designated motor $M_B$ (FIG. 18) for the purpose of further explanation. Movement of the actuator in the direction of arrow 67 will bring projection 61 into engagement with finger 31b, projection 58 into engagement with fingers 31a and 30b and projection 60 into engagement with finger 30a whereby both motors will again be actuated but motor $M_A$ will be driven in the reverse direction because the current to its contacts has been reversed. It should now be apparent that movement of the actuator in the direction of arrow 68 will cause both motors to be driven in the reverse direction, and movement in the direction of arrow 69 will cause motor $M_B$ to be driven in the reverse direction with motor $M_A$ being driven in the original or forward direction. The switch actuator can thus be made to satisfy as many as eight different conditions whereby the motors can be driven singly or together and in any desired direction.

As noted hereinabove, the metal actuator plunger element 40 is movable longitudinally in the actuator sleeve 39 and it is movable between two alternative positions illustrated in FIGURES 1 and 2. In the position shown in FIGURE 2, the plunger is insulated from the contact plates 48a, 48b by means of the non-conducting sleeve 39. However, when the operating knob 23 for the actuator is pulled outwardly into the position shown in FIGURE 1, a metal cup 70 on the inner end of the plunger moves into engagement with the contact plate 48b and provides a current path between the plate and plunger so that the latter can complete circuits through an external load and a self-contained pilot lamp which will now be described.

The external load in a remotely located device of the type previously referred to would be a spotlight lamp L (FIG. 18) which would be connected to the switch assembly by means of conductors 71, 72, FIGURES 1 and 2. Conductor 71 is connected to the outer end of the lead in strip 54 for contact plate 48a and thus connects one side of the lamp directly to the current source through the battery conductor 57. Conductor 72 is connected to the end of a lead in strip 73 that lies in a plane perpendicular to the plane of the lead in strips 54 and enters the housing through a slot 74 in the housing flange 25. Within the housing, strip 73 is secured to the actuator sleeve 39 by means of a swaged over projection 75, FIGURES 2 and 14, and terminates in a curved contact finger 76 which projects through a slot 77 in the sleeve for engagement with the actuator plunger 40, the finger engaging the plunger at necked down portions 78 thereof in either longitudinal position of the plunger whereby the finger and portions coact to provide stops for the two alternative positions. With this arrangement, when the actuator is pulled outwardly the circuit for the spotlight lamp is completed from one side of the battery through conductor 57 (FIGURE 1), lead in strip 54, contact plate 48b, cup 70, actuator plunger 40, contact finger 76 (FIGURE 2), and conduuctor 72 to one side of the lamp, and from the other side of the lamp back through conductors 71 and 57 (FIGURE 1), to the other side of the battery.

The pilot lamp 79, which is provided to indicate to the operator whether the remotely located spotlight lamp is on or off, is mounted in a sleeve bushing 80 shown in FIGURES 1, 2, 10 and 11. The bushing is formed of a non-conducting material such as plastic and is pressed onto the outer end of the actuator plunger 40, the latter having a plurality of sharp annular shoulders 81 which project into the softer plastic material of the bushing to prevent accidental disengagement of the parts. The operating knob 23 for the actuator is mounted on the outer end of the bushing 80 by means of coacting ribs and grooves 82 and a translucent plug 83 is secured as by a press fit in the outer end of the knob to transmit the light from the pilot lamp.

The sleeve bushing 80 carries a contact sleeve 84, FIGURES 1, 2, 15 and 16, having a pair of axially projecting fingers 85 which lie in a pair of diametral cut-away portions 86 on the outer enlarged end of the bushing, and the ends of these fingers are turned inwardly to engage the threads of the bulb socket as shown. The contact sleeve is engaged by a pilot contact finger 87, the inner end of which lies in a longitudinal groove 88 in the actuator sleeve 39, FIGURES 2, 7 and 12–14, the finger being secured to the sleeve by a swaged over projection 89 which is diametrically opposite the projection 75. As is best shown in FIGURES 12 and 14, the end of the contact finger 87 is provided with an extension 90 which contacts the extension arm 53 of the contact plate 48a so that current delivered to the plate is also delivered to the pilot contact finger.

The base terminal of the pilot lamp 79 is engaged by a compression spring 91, the inner end of which is received in a bore 92 in the outer end of the actuator plunger 40. Accordingly, when the actuator is pulled outwardly to light the spotlight lamp, the circuit for the pilot lamp is also completed from one side of the battery through conductors 57 (FIGURE 1), contact plate 48b, cup 70, actuator plunger 40 and spring 91 to the base terminal of the bulb, and from the other terminal of the bulb through contact sleeve 84, contact finger 87 (FIGURE 2), contact plate 48a (FIGURE 1) and conductor 57 to the other side of the battery.

In FIGURE 18, the switch assembly of FIGURES 1 and 2 is diagrammatically shown electrically connected so as to operate the lamp L of a spotlight constructed as described in the aforesaid Patent 3,035,160. As hereinabove described the U-shaped contact finger 30a is electrically connected, through its rivet 35 (FIG. 1), to conductor 36 leading to one side of motor $M_A$ of the searchlight, and the finger 30b is connected through its rivet to conductor 37 leading to the other side of the motor $M_A$. Similarly the fingers 31a and 31b are connected by their respective rivets 38 (FIG. 2) to conductors 38a and 38b, respectively, to either side of the other spotlight motor $M_B$.

The contact plate 48a, carried by sleeve 39 on the plunger rod 40, is electrically connected through its neck 53 and lead in strip 54 to a conductor 57 leading to the positive side of a power source indicated as a battery P. The contact plate 48b, similarly supported, is connected through its neck 53, lead in strip 54, and conductor 57 to the negative side of battery P, and one side of lamp L is permanently connected to this side of the battery by the conductor 71 by means of its connection with the latter conductor 57 as shown in FIGURE 1.

The other side of lamp L is electrically connected by conductor 72 to lead in strip 73 (FIG. 2) which has its curved contact finger 76 in contact with plunger 40.

The pilot lamp 79 has one terminal electrically connected to plunger 40 through the spring 91, the other terminal being connected through fingers 85 of contact sleeve 86, contact finger 87 (FIG. 2), through its extension 90 (FIG. 14), to the contact arm 53 of the plate 48a which is connected, as described above, to the positive side of battery P.

When the operating knob 23 is pulled outward, plunger 40 is moved longitudinally in the direction indicated by the arrow K in FIGURE 18, until the metal cup 70 on the end of the plunger is in electrical contact with contact plate 48b, and the plunger 40 is thus electrically connected through plate 48b to the negative side of battery P. One side of searchlight lamp L and pilot lamp 79, respectively, being permanently connected to one side of the battery P, circuits are completed through both lamps, when plunger 40 is connected to the other side of the battery, since the other side of each lamp is connected to the plunger 40.

When the operating knob 23 is moved laterally so that its inner end is moved in any one of the eight directions indicated by the arrows 61–69, inclusive, of FIGURES 17 and 18 the spotlight lamp L is pivotally moved in one direction or another by one or both of the motors $M_A$ and $M_B$ as hereinabove described in connection with FIGURE 17.

From the foregoing description, it will be apparent that the invention disclosed herein provides a very versatile and useful switch assembly of the multi-position type. As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. In a switch assembly for selectively supplying current to more than one electrically operated instrumentality: a housing having an open end, a plurality of output contact fingers mounted in said housing adjacent the sidewalls thereof, an elongated actuator projecting axially into said housing through the open end thereof, said actuator including a sleeve and a plunger element movable longitudinally in said sleeve, a resilient diaphragm member secured at its center to said sleeve and secured at its perimeter to the open end of said housing for flexibly supporting said actuator in said housing, said diaphragm member normally holding said actuator centrally in said housing but adapted for gyratory movement of the inner end of said actuator relative thereto, a pair of contact plates transversely mounted on said sleeve within said housing, said contact plates being insulated from one another and having portions projecting alternately from each plate toward alternate contact fingers, and means to supply current to each plate, said actuator supporting means permitting movement of the actuator for selective engagement of said contact plates with said alternate contact fingers.

2. Structure as defined in claim 1 together with a pilot lamp at the outer end of said plunger element and means coacting with the element and controlled by the longitudinal position thereof in said sleeve to complete a circuit from said current supply means through the lamp.

3. In a switch assembly for selectively supplying current to more than one electrically operated instrumentality: a housing having an open end, a pair of output contact fingers mounted in said housing adjacent the side walls thereof on each of four sides about the central axis thereof, an elongated actuator projecting axially into said housing through the open end thereof, said actuator including an insulating sleeve and a current conducting plunger element movable longitudinally in said sleeve, a plurality of contact plates transversely mounted on said sleeve adjacent the inner end thereof, said plates being insulated from said plunger element and one another, each plate having a portion projecting toward alternate contact fingers on each side, a resilient diaphragm member circumferentially secured to the open end of said housing and centrally secured to said actuator sleeve to normally support the actuator centrally in the housing with the contact plates at the inner end of the sleeve spaced from said contact fingers, means to supply current to each plate including a resilient conductor extending radially from said sleeve along said diaphragm member said diaphragm and resilient conductors being adapted for movement of the inner end of said actuator for selective engagement of said plates with said contact fingers, means on said plunger element engageable with one of said contact plates to supply current to the element in one longitudinal position thereof, and means coacting with said plunger element to complete an independent circuit through the element when current is supplied thereto.

4. Structure as defined in claim 3 wherein said means coacting with said plunger element includes a permanently engaged contact finger engaging the element and connected to one side of an external load, the other side of said load being connected to the current supply means for said other contact plate, said plunger element having detent grooves cooperating with said last mentioned finger for selectively maintaining said element in current-on and current-off position with respect to said independent circuit.

5. In a switch assembly for the remote operation of a plurality of electrically operated instrumentalities including a pair of reversible electric drive motors: a rectangular housing having an open end, a first and a second pair of U-shaped contact fingers mounted in said housing adjacent the side and end walls thereof, said first pair of fingers being disposed along two opposite side walls and the second pair of fingers being disposed along the adjacent opposite side walls, said fingers being insulated from one another with each pair of fingers being adapted to be connected through one of said drive motors, an elongated actuator projecting axially into said housing through the open end thereof, said actuator including an insulating sleeve and a current conducting plunger movable longitudinally in said sleeve, a pair of contact plates transversely mounted on said sleeve adjacent the inner end thereof, said plates being insulated from said plunger and from one another, each plate having a portion projecting toward one finger of each pair on one side and toward the other finger of said pair on the diametrically opposite side of said sleeve, means to connect each plate with a source of electric current, a flexible support for said actuator comprising a resilient diaphragm member circumferentially secured to the open end of said housing and centrally secured about said actuator sleeve to normally maintain the actuator centrally in the housing with the contact plates at the inner end of the sleeve spaced from said contact fingers, said diaphragm support being adapted for movement of the inner end of said actuator for selective engagement of said contact plates with said pairs of contact fingers to actuate said motors, a single contact finger engaging said actuator plunger, means for connecting said finger to one terminal of a third one of said instrumentalities, means for connecting the other terminal of said third instrumentality to the current supply means for one of said contact plates, means on said plunger engageable with the other contact plate in one longitudinal position of the plunger to complete a circuit through the plunger and single contact finger to said third instrumentality, a pilot lamp mounted on the outer end of said actuator plunger, and means to complete a circuit through said pilot lamp when said plunger is in position to complete the circuit through said third instrumentality.

6. Structure as defined in claim 5 wherein said projecting portions of each plate are at alternate opposite corners thereof, whereby said contact plates are simultaneously engageable with the side legs of both pairs of contact fingers along adjacent side walls of the housing.

7. In a switch assembly for the remote operation of a plurality of electrically operated instrumentalities including a pair of reversible electric drive motors: a housing, an elongated actuator projecting partially into said housing, means centrally secured to said actuator and circumferentially secured to said housing for both longitudinal movement and gyratory end movement relative to said housing, a pair of contact plates on said actuator within said housing, means to deliver current from the opposite terminals of an external source to each of said plates respectively, coacting contact means in said housing arranged and disposed in pairs on each side of said contact plates, each contact of each pair being connected to the respectively opposite contact of the pair on the opposite side of said contact plates, each connected pair being adapted to be connected through a different one of said motors, each contact plate having projecting portions at different opposite corners thereof, and additional means on said actuator operable to deliver current to another of said instrumentalities when the outer end of the actuator is manipulated to produce longitudinal movement thereof.

8. In a switch assembly for the remote operation of a plurality of electrically operated instrumentalities including a pair of reversing electric drive motors: a rectangular switch housing, a first and a second pair of U-shaped contact fingers mounted in said housing adjacent the side walls thereof with said pairs at right angles to one another, said fingers being insulated from one another with each pair of fingers being adapted to be connected through one of said drive motors, an elongated actuator projecting partially into said housing, resilient diaphragm means secured to said actuator and to said housing for supporting said actuator for both longitudinal movement and gyratory end movement relative to said housing, means to deliver current from an external source to said actuator, a pair of contact plates on said actuator selectively engageable with said pairs of contact fingers to actuate said motors when the outer end of the actuator is manipulated to produce gyratory movement thereof, means engaging said actuator and operable to deliver current to another of said instrumentalities when the outer end of the actuator is manipulated to produce longitudinal movement thereof, a pilot lamp mounted at the outer end of said actuator, and means coacting with the actuator to complete a circuit through said pilot lamp whenever the actuator is manipulated to deliver current to said another of said instrumentalities.

9. In a switch assembly for the remote operation of a plurality of electrically operated instrumentalities including a pair of reversible electric drive motors: a rectangular housing having an open end, a first and a second pair of U-shaped contact fingers mounted in said housing adjacent the side and end walls thereof, the side arms of said first pair of fingers being disposed along two opposite side walls and the side arms of said second pair of fingers being disposed along the adjacent opposite side walls, said fingers being insulated from one another, each pair of fingers being adapted to be connected through one of said drive motors, an elongated actuator projecting axially into said housing through the open end thereof, a pair of contact plates transversely mounted on said actuator adjacent the inner end thereof, said plates being insulated from said actuator and from one another, each plate having a portion projecting toward one finger of each pair on one side and toward the other finger of said pair on the diametrically opposite side, means connecting said plates through a source of electric current, and a flexible support for said actuator to normally support said plates in said housing spaced from said contact fingers, said actuator being thereby adapted for movement of said plates from side to side for selective engagement with said contact fingers, whereby said plates may be moved in one direction into contact with one pair of fingers to actuate the connected motor and moved in the opposite direction to contact said pair and actuate said motor in the reverse direction.

10. Structure as defined in claim 9 wherein said projecting portions of each of said plates are at diametrically opposite corners, whereby said plates may be moved diagonally by said actuator for engaging the side legs of both pairs of contact fingers along adjacent side walls of the housing.

References Cited in the file of this patent

UNITED STATES PATENTS

| | | |
|---|---|---|
| 1,954,272 | Taylor | Apr. 10, 1934 |
| 2,591,336 | Bordelon | Apr. 1, 1952 |
| 2,754,411 | Dohrmann | July 10, 1956 |
| 2,857,485 | Brooks | Oct. 21, 1958 |
| 2,866,153 | Rhoades | Dec. 23, 1958 |
| 2,939,287 | Capron et al. | June 7, 1960 |